United States Patent
Chen et al.

(10) Patent No.: US 7,827,541 B2
(45) Date of Patent: Nov. 2, 2010

(54) METHOD AND APPARATUS FOR PROFILING EXECUTION OF CODE USING MULTIPLE PROCESSORS

(75) Inventors: Wen-Tzer Thomas Chen, Austin, TX (US); Jimmie Earl DeWitt, Jr., Georgetown, TX (US); Frank Eliot Levine, Austin, TX (US); Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 11/377,508

(22) Filed: Mar. 16, 2006

(65) Prior Publication Data

US 2007/0220495 A1    Sep. 20, 2007

(51) Int. Cl.
    *G06F 9/44* (2006.01)
(52) U.S. Cl. .................................................. 717/130
(58) Field of Classification Search ................. 717/128, 717/130; 714/39, 47
    See application file for complete search history.

(56) References Cited

U.S. PATENT DOCUMENTS

| | | | |
|---|---|---|---|
| 6,021,457 A | 2/2000 | Archer et al. | |
| 6,081,868 A * | 6/2000 | Brooks | 711/3 |
| 6,349,406 B1 | 2/2002 | Levine et al. | |
| 6,539,339 B1 | 3/2003 | Berry et al. | |
| 6,813,760 B1 | 11/2004 | Fitzel et al. | |
| 6,957,208 B1 * | 10/2005 | Boucher et al. | 706/55 |
| 7,293,260 B1 * | 11/2007 | Dmitriev | 717/130 |
| 7,401,324 B1 * | 7/2008 | Dmitriev | 717/130 |
| 7,421,681 B2 * | 9/2008 | DeWitt et al. | 717/128 |
| 2002/0165892 A1 * | 11/2002 | Grumann et al. | 709/100 |
| 2003/0140282 A1 * | 7/2003 | Kaler et al. | 714/39 |
| 2004/0054992 A1 * | 3/2004 | Nair et al. | 717/138 |
| 2005/0081010 A1 * | 4/2005 | DeWitt et al. | 711/165 |
| 2007/0260849 A1 * | 11/2007 | Chen et al. | 712/34 |

OTHER PUBLICATIONS

Xu et al., "Dynamic Instrumentation of Threaded Applications",Proceedings of the seventh ACM SIGPLAN symposium on Principles and practice of parallel programming table of contents, Atlanta, Georgia, United States pp. 49-59, May 1999, pp. 49-59.*

* cited by examiner

*Primary Examiner*—Wei Y Zhen
*Assistant Examiner*—Chih-Ching Chow
(74) *Attorney, Agent, or Firm*—Yee & Associates, P.C.; David A. Mims, Jr.

(57) ABSTRACT

A computer implemented method, apparatus, and computer usable medium for gathering performance related data in a multiprocessing environment. Instrumentation code is executed on a processor that minimizes the distortion to the processor resources used to execute the program to be profiled. Data is written by the instrumentation code to a shared memory in response to an event occurring during execution of the program. The data is generated during execution of the program on the processor and the instrumentation code uses shared memory to convey the data to a profiling application running on a set of profiling processors. The data is collected by the set of profiling processors in the shared memory written by the instrumentation code.

34 Claims, 5 Drawing Sheets

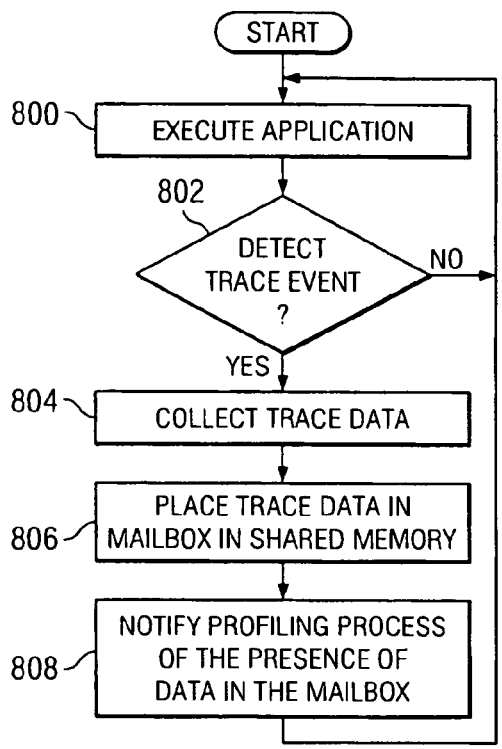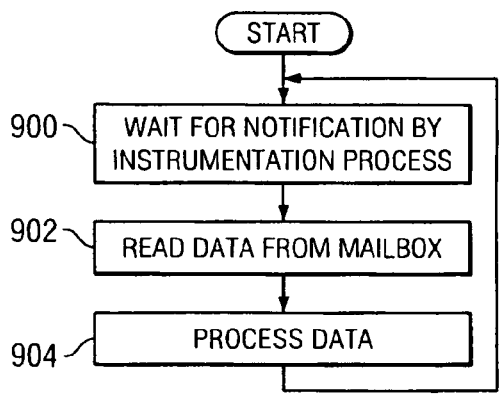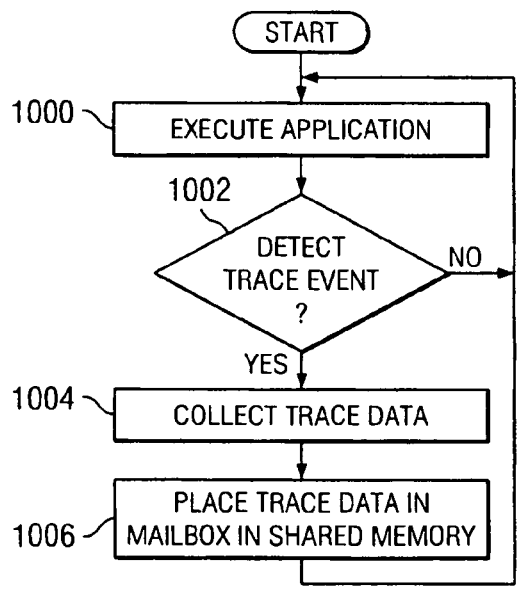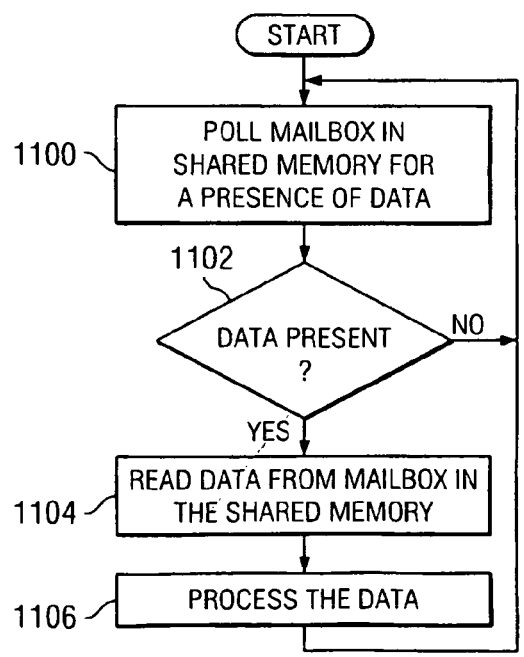

METHOD AND APPARATUS FOR PROFILING EXECUTION OF CODE USING MULTIPLE PROCESSORS

BACKGROUND OF THE INVENTION

1. Field of the Invention

The present invention relates generally to an improved data processing system and in particular to a computer implemented method and apparatus for processing data. Still more particularly, the present invention relates to a computer implemented method, apparatus, and computer usable program code for collecting and processing data during the execution of code.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility of a trace system. A trace tool may be used using various techniques to provide information, such as execution flows as well as other aspects of an executing program. A trace may contain data about the execution of code. For example, a trace may contain trace records about events generated during the execution of the code. A trace also may include information, such as, a process identifier, a thread identifier, and a program counter. Information in the trace may vary depending on the particular profiling or analysis that is to be performed. A record is a unit of information relating to an event that is detected during the execution of the code.

Profiling is a process performed to extract regular and reoccurring operations or events present during the execution of code. Many different types of events may be profiled. For example, the time spent in a task or section of code, memory allocation, and most executed instructions. The results of profiling are used to optimize or increase the performance of software. Oftentimes profiling may be used to tune or improve performance of a particular piece of software for a specific processor.

Typically, profiling is performed using the processor's own resources. These resources are often disturbed by the profiling code as the profiling code executes on the processor. The processor's caches and pipelines are shared by the application and the profiling code, which introduces changes to the processor's resources and the measurements collected by the profiling code. An example of a particular type of profiling with this problem is an instruction trace, which takes an exception on branches or on each instruction. It would be desirable, if during tracing, the resources being recorded were not affected by tracing. For example, allowing reporting of cache misses or any other performance monitoring metric by a routine would be a great enhancement to this type of tool. Similarly, a JAVA profiler, as described in U.S. Pat. No. 6,539,339, also referred to as jprof, would be significantly enhanced if the processing of this tool did not affect the processor's resources as the application or system is being profiled. Jprof uses event based support, getting control on entries to and exits from methods. Jprof gets the current value of a performance monitor counter on each entry and exit. The counter values could include completed instructions or cycles, which would be the metrics to be applied to the active method. Since any performance monitor counter could be used, these metrics are referred to as the collected data. These tools both provide a mechanism to rollup performance counter information by method and call stack by thread. Similarly, other code could be profiled and the same information could be applied to subroutines/functions. However, with the current profiling techniques, the usefulness of these tools are diminished because the use of processor resources to perform profiling functions affects the processor's resources.

SUMMARY OF THE INVENTION

The present invention provides a method, apparatus, and computer usable medium for gathering performance related data in a multiprocessing environment. An instrumented or monitored program writes performance data to a shared memory in response to events occurring during execution of the program. The instrumentation code in the instrumented program collects data and executes with minimal impact to the resources being measured in the instrumentation processor. The collected data is then provided to the set of profiling processors.

The set of profiling processors process the data and produce reports. Execution of the program may be halted until an indication is received from the set of profiling processors that the data has been collected by the set of processors. The data may be written into the shared memory. The writing of data may comprise collecting raw data in an instrumentation stub; converting the raw data into per thread data; and writing the per thread data to the shared memory. The per thread data is data for a particular thread.

A signal may be sent by the instrumentation processor to the set of profiling processors to indicate that performance related data is available in the shared memory. A remote procedure call may be made by the processor to the set of profiling processors and an inter-processor interrupt is sent from the processor to the set of profiling processors. The shared memory may be polled by the set of processors to determine when the data is available for collection. The data is processed for analysis. This processing may occur on either the instrumentation processor or the set of processors. This processing may include the generation of a profile, which may include a profile of resources used by the program executing on the instrumentation processor.

The instrumentation code is an instrumentation stub in the examples. The set of profiling processors may comprise a processor core. The shared memory may comprise a set or memory mapped registers that have addresses accessible by the set of profiling processors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart of a process for storing data generated by trace event in a shared memory in accordance with an illustrative embodiment of the present invention;

FIG. 9 is a flowchart of a process for a profiling processor to collect and process data from a mailbox in a shared memory in accordance with an illustrative embodiment of the present invention;

FIG. 10 is a flowchart of a process for use in an instrumentation processor for a polling protocol to collect and store data in accordance with an illustrative embodiment of the present invention; and FIG. 11 is a flowchart of a process for use in a profiling processor to obtain data using a polling protocol in accordance with an illustrative embodiment of the present invention.

DETAILED DESCRIPTION OF THE PREFERRED EMBODIMENT

Figure 1:
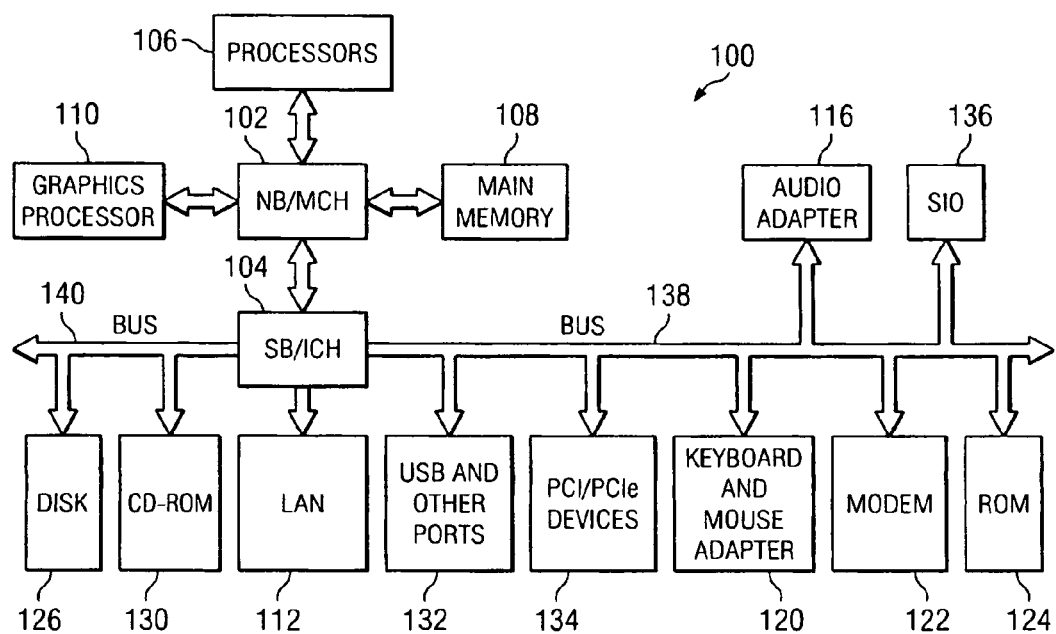
FIG. 1 is a block diagram of a data processing system in which aspects of the present invention may be implemented.

With reference now to the figures and in particular with reference to FIG. 1, a block diagram of a data processing system is shown in which aspects of the present invention may be implemented. Data processing system 100 is an example of a computer, in which code or instructions implementing the processes of the present invention may be located. In the depicted example, data processing system 100 employs a hub architecture including a north bridge and memory controller hub (MCH) 102 and a south bridge and input/output (I/O) controller hub (ICH) 104. Processors 106, main memory 108, and graphics processor 110 are connected to north bridge and memory controller hub 102. Processors 106 comprise two or more processors in these examples. Graphics processor 110 may be connected to the MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the JAVA$^{TM}$ programming system, may run in conjunction with the operating system and provides calls to the operating system from JAVA programs or applications executing on data processing system 100 (JAVA is a trademark of Sun Microsystems, Inc. in the United States, other countries, or both).

Instructions for the operating system, the object-oriented programming system, and applications or programs are located on storage devices, such as hard disk drive 126, and may be loaded into main memory 108 for execution by processor 106. The processes of the present invention are performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the present invention may be applied to a multiprocessor data processing system.

In some illustrative examples, a bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations.

Figure 2:
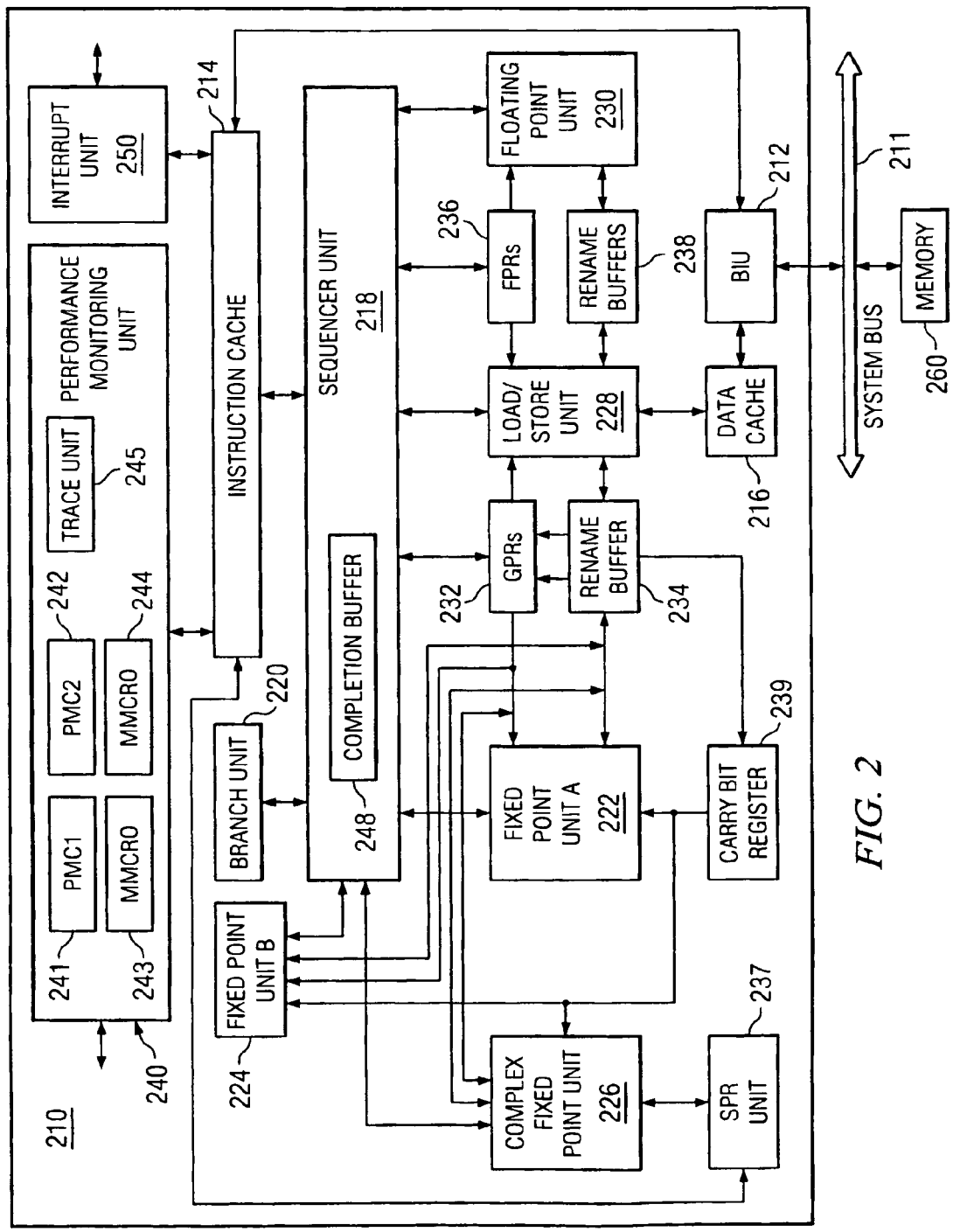
FIG. 2 is a block diagram of a processor system for processing information in accordance with a preferred embodiment of the present invention.

Next, FIG. 2 depicts a block diagram of a processor system for processing information in accordance with a preferred embodiment of the present invention. Processor 210 may be implemented as processor 106 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 connects to a bus interface unit ("BIU") 212 of processor 210. BIU 212 controls the transfer of information between processor 210 and system bus 211.

BIU 212 connects to instruction cache 214 and data cache 216 of processor 210. Instruction cache 214 outputs instructions to sequencer unit 218 and sequencer unit 218 selectively outputs instructions to other execution circuitry of processor 210, such as branch unit 220, a fixed-point unit A ("FXUA") 222, fixed-point unit B ("FXUB") 224, complex fixed-point unit ("CFXU") 226, load/store unit ("LSU") 228, and floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a load instruction received from sequencer unit 218, LSU 228 inputs data from data cache 216 and copies such data to selected ones of rename buffers 234 and 238. If such data is not stored in data cache 216, then data cache 216 receives (through BIU 212 and system bus 211) the data from a system memory 260. Moreover, data cache 216 outputs the data to system memory 260 via through BIU 212 and system bus 211. In response to a store instruction received from sequencer unit 218, LSU 228 inputs data from a selected one of GPRs 232 and FPRs 236 and copies this data to data cache 216.

Sequencer unit 218 inputs and outputs instructions to and from GPRs 232 and FPRs 236. From sequencer unit 218, branch unit 220 inputs instructions and signals indicating a present state of processor 210. In response to such instructions and signals, branch unit 220 outputs, to sequencer unit 218, signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As execution units store data at a selected one of rename buffers 234, the execution units associate this data with a storage location (e.g. one of GPRs 232 or carry bit (CA) register 239) as specified by the instruction for which the selected rename buffer is allocated. Sequencer unit 218 generates signals to cause data stored at a selected one of rename buffers 234 to be copied to its associated one of GPRs 232 or CA register 239. Sequencer unit 218 directs such copying of information stored at a selected one of rename buffers 234 in response to "completing" the instruction that generated the information. Such copying is called "writeback."

Execution units store data at a selected one of rename buffers 238. These execution units cause the association of data with one of FPRs 236. Sequencer 218 generates signals that cause data stored at a selected one of rename buffers 238 to be copied to its associated one of FPRs 236. Sequencer unit 218 directs such copying of data at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, processor 210 processes each instruction as a sequence of stages, each being executable in parallel with stages of other instructions. Such a technique is called "pipelining." In an illustrative embodiment, processor 210 processes an instruction normally as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218. In the decode stage, sequencer unit 218 decodes up to four fetched instructions. In the dispatch stage, sequencer unit 218 selectively dispatches up to four decoded instructions to selected ones of execution units 220, 222, 224, 226, 228, and 230 after reserving rename buffer entries in rename buffers 234 and 238 for the dispatched instructions' results (destination operand information). In the dispatch stage, sequencer unit 218 supplies operand information to the selected execution units for dispatched instructions. Processor 210 dispatches instructions in order of their programmed sequence.

In the execute stage, execution units, such as execution units 220, 222, 224, 226, 228, and 230, execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete" by placing this indication in completion buffer 248. Processor 210 "completes" instructions in the order of their programmed sequence.

In the writeback stage, sequencer 218 directs the copying of data from rename buffers 234 and 238 to GPRs 232 and FPRs 236, respectively.

Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, instructions each require one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248, within sequencer 218, is used to track the completion of the multiple instructions that are being executed within the execution units, such as execution units 220, 222, 224, 226, 228, and 230. Upon an indication in completion buffer 248 that an instruction or a group of instructions have been completed successfully, in an application specified sequential order, completion buffer 248 may be utilized to initiate the transfer of the results of those completed instructions to the associated general-purpose registers, such as GPRs 232.

In addition, processor 210 also includes performance monitoring unit 240, which is connected to instruction cache 214 as well as other units in processor 210. Operation of processor 210 can be monitored utilizing performance monitoring unit 240, which in this illustrative embodiment is a software-accessible mechanism capable of providing detailed information descriptive of the utilization of instruction execution resources and storage control.

Although not illustrated in FIG. 2, performance monitoring unit 240 couples to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, cycles, completed instructions, and cache hits.

Performance monitoring unit 240 includes an implementation-dependent number (e.g., 2-8) of counters 241-242, labeled PMC1 and PMC2, which are utilized to count occurrences of selected events. Performance monitoring unit 240 further includes at least one monitor mode control register (MMCR). In this example, two control registers, MMCRs 243 and 244, specify the function of counters 241-242. Counters 241-242 and MMCRs 243-244 are preferably implemented as special purpose registers (SPRs) that are accessible for read or write via MFSPR (move from SPR) and MTSPR (move to SPR) instructions executable by CFPU 226. However, in one alternative embodiment, counters 241-242 and MMCRs 243-244 may be implemented simply as addresses in I/O space.

In another alternative embodiment, the control registers and counters may be accessed indirectly via an index register. This embodiment is implemented in the IA-64 architecture in processors from Intel Corporation.

The various components within performance monitoring unit 240 may be used to generate data for performance analysis. Depending on the particular implementation, the different components may be used to generate trace data. In other illustrative embodiments, performance monitoring unit 240 may provide data for time profiling with support for dynamic address to name resolution. When providing trace data, performance monitoring unit 240 may include trace unit 245, which contains circuitry and logical units needed to generate traces. In particular, in these illustrative examples, trace unit 245 may generate compressed trace data.

Additionally, processor 210 also includes interrupt unit 250 connected to instruction cache 214. Although not shown in FIG. 2, interrupt unit 250 is connected to other functional units within processor 210. Interrupt unit 250 may receive signals from other functional units and initiate an action, such as starting an error handling or trap process. In these examples, interrupt unit 250 generates interrupts and exceptions that may occur during execution of a program.

Figure 3:
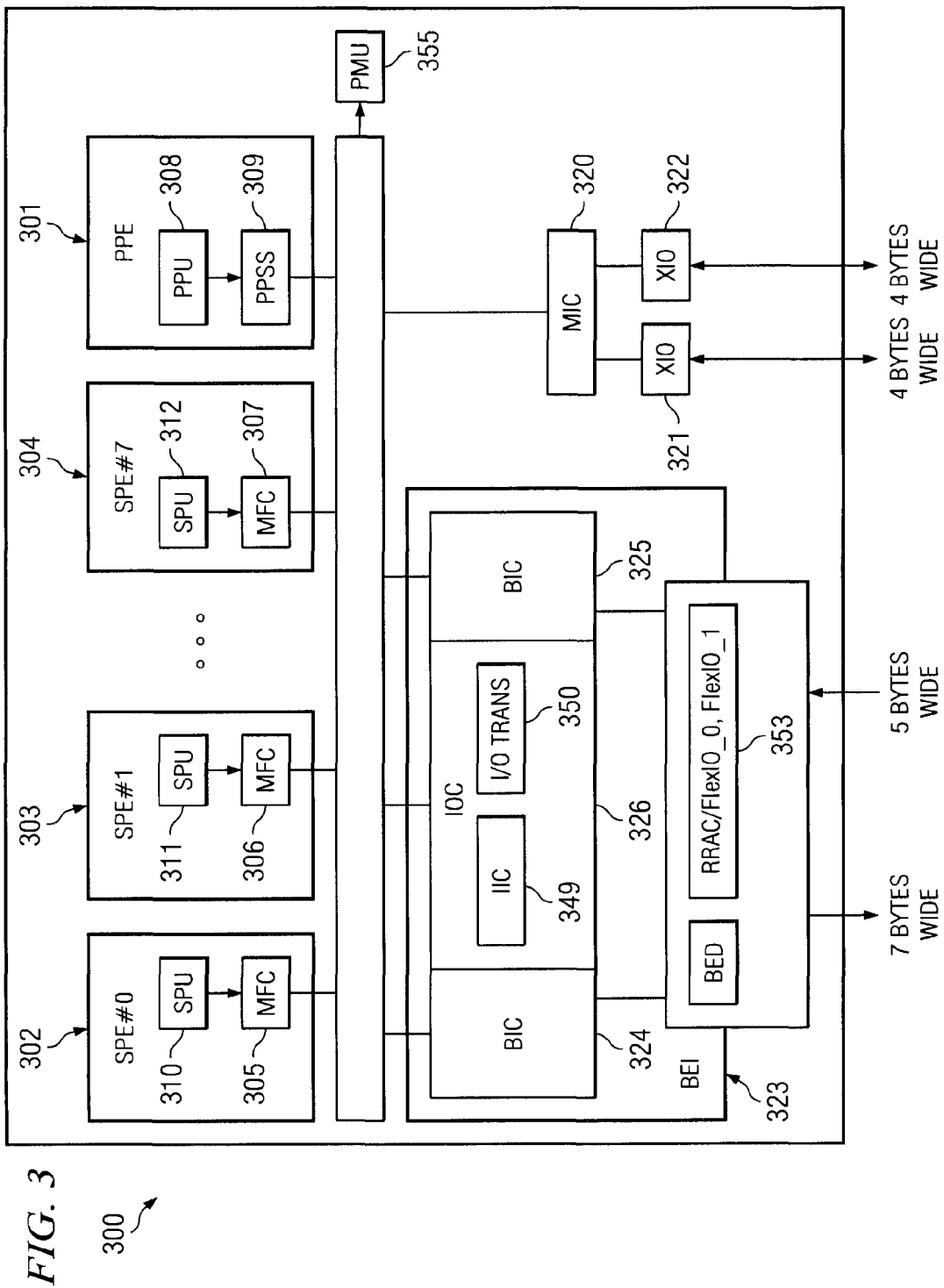
FIG. 3 is an exemplary diagram of a cell broadband engine chip in which aspects of the illustrative embodiments may be implemented in accordance with an illustrative embodiment of the present invention.

FIG. 3 is an exemplary diagram of a cell broadband engine chip in which aspects of the illustrative embodiments may be implemented in accordance with an illustrative embodiment. Cell broadband engine chip 300 is a single-chip multiprocessor implementation directed toward distributed processing targeted for media-rich applications such as game consoles, desktop systems, and servers.

Cell broadband engine chip 300 may be logically separated into the following functional components: Power PC® processor element (PPE) 301, synergistic processor units (SPU) 310, 311, and 312, and memory flow controllers (MFC) 305, 306, and 307. Although synergistic processor elements and Power PC® processor elements are shown by example, any type of processor element may be supported. In these examples, cell broadband engine chip 300 implementation includes one Power PC® processor element 301 and eight synergistic processor elements, although FIG. 3 shows only three synergistic processor elements (SPEs) 302, 303, and 304. The synergistic processor element (SPE) of a CELL Processor is a first implementation of a new processor architecture designed to accelerate media and data streaming workloads.

Each synergistic processor element includes one synergistic processor unit (SPU) 310, 311, or 312 with its own local store (LS) area and a dedicated memory flow controller (MFC) 305, 306, or 307 that has an associated memory management unit (MMU) to hold and process memory protection and access permission information. Once again, although synergistic processor units are shown by example, any type of processor unit may be supported. Additionally, cell broadband engine chip 300 implements element interconnect bus (EIB) 319 and other I/O structures to facilitate on-chip and external data flow. Element interconnect bus 319 serves as the primary on-chip bus for Power PC® processor element 301 and synergistic processor elements 302, 303, and 304. In addition, element interconnect bus 319 interfaces to other on-chip interface controllers that are dedicated to off-chip accesses. The on-chip interface controllers include the memory interface controller (MIC) 320, which provides two extreme data rate I/O (XIO) memory channels 321 and 322, and cell broadband engine interface unit (BEI) 323, which provides two high-speed external I/O channels and the internal interrupt control for the cell broadband engine 300. The cell broadband engine interface unit 323 is implemented as bus interface controllers (BICO & BICL) 324 and 325 and I/O interface controller (IOC) 326. The two high-speed external I/O channels connected to a polarity of RRAC interfaces providing the flexible input and output (FlexIO_0 & FlexIO_1) 353 for the cell broadband engine 300.

Main storage is shared by Power PC® processor unit 308, the power processor element (PPE) 301, synergistic processor elements (SPEs) 302, 303, and 304, and I/O devices in a system. All information held in this level of storage is visible to all processors and devices in the system. Programs reference this level of storage using an effective address. Since the memory flow controller synergistic processor unit command queue and the memory flow controller proxy command queue and control and status facilities are mapped to the effective address space, it is possible for power processor element 301 to initiate direct memory access operations involving a local store area associated with any of synergistic processor elements (SPEs) 302, 303, and 304.

A synergistic processor unit program accesses main storage by generating and placing a direct memory access data transfer command, with the appropriate effective address and local store address, into its memory flow controllers (MFCs) 305, 306, or 307 command queue for execution. When executed, the required data are transferred between its own local store area and main storage. Memory flow controllers (MFCs) 305, 306, or 307 provide a second proxy command queue for commands generated by other devices such as the power processor element (PPE) 301. The proxy command queue is typically used to store a program in local storage prior to starting the synergic processor unit. Proxy commands can also be used for context store operations.

The effective address part of the data transfer is much more general, and can reference main storage, including all synergistic processor unit local store areas. These local store areas are mapped into the effective address space. The data transfers are protected. An effective address is translated to a real address through a memory management unit. The translation process allows for virtualization of system memory and memory protection.

Power PC® processor element 301 on cell broadband engine chip 300 consists of 64-bit Power PC® processor unit 308 and Power PC® storage subsystem 309. Synergistic processor units (SPU) 310, 311, or 312 and memory flow controllers 305, 306, and 307 communicate with each other through unidirectional channels that have capacity. The channel interface transports messages to and from memory flow controllers 305, 306, and 307, synergistic processor units 310, 311, and 312.

Element interconnect bus 319 provides a communication path between all of the processors on cell broadband engine chip 300 and the external interface controllers attached to element interconnect bus 319. Memory interface controller 320 provides an interface between element interconnect bus 319 and one or two of extreme data rate I/O cell memory channels 321 and 322. Extreme data rate (XDR™) dynamic random access memory (DRAM) is a high-speed, highly serial memory provided by Rambus. The extreme data rate dynamic random access memory is accessed using a macro provided by Rambus, referred to in this document as extreme data rate I/O cell memory channels 321 and 322.

Memory interface controller 320 is only a slave on element interconnect bus 319. Memory interface controller 320 acknowledges commands in its configured address range(s), corresponding to the memory in the supported hubs.

Bus interface controllers (BIC) 324 and 325 manage data transfer on and off the chip from element interconnect bus 319 to either of two external devices. Bus interface controllers 324 and 325 may exchange non-coherent traffic with an I/O device, or it can extend element interconnect bus 319 to another device, which could even be another cell broadband engine chip. When used to extend the element interconnect bus, coherency is maintained between caches in the cell broadband engine and caches in the external device attached.

I/O interface controller 326 handles commands that originate in an I/O interface device and that are destined for the coherent element interconnect bus 319. An I/O interface device may be any device that attaches to an I/O interface such as an I/O bridge chip that attaches multiple I/O devices or another cell broadband engine chip 300 that is accessed in a non-coherent manner. I/O interface controller 326 also intercepts accesses on element interconnect bus 319 that are destined to memory-mapped registers that reside in or behind an I/O bridge chip or non-coherent cell broadband engine chip 300, and routes them to the proper I/O interface. I/O interface controller 326 also includes internal interrupt controller (IIC) 349 and I/O address translation unit (I/O Trans) 350. Cell broadband engine chip 300 also contains performance monitoring unit (PMU) 355. In this example, performance monitoring unit 355 contains counters, registers and logics similar to performance monitoring unit 240 in FIG. 2. These registers may be memory mapped to allow access to the registers by other processors.

Although specific examples of how the different components may be implemented have been provided, this is not meant to limit the architecture in which the aspects of the illustrative embodiments may be used. The aspects of the illustrative embodiments may be used with any multi-processor systems, such as, multi-core processors.

The aspects of the present invention provide a computer implemented method, apparatus, and computer usable program code for minimizing distortions of processor resources being measured during the execution of code. The aspects of the present invention support the use of separate processors for performance analysis and the collection of data. Multiple processors are employed in this type of approach. One processor is used to execute instrumented code. This processor generates trace events or other types of data for processing. This processor is referred to as the instrumentation processor.

The set processor is used to analyze or process the data for analysis. This second processor is part of the set of profiling processors. Depending on the implementation, the second processor may be the only processor in the set of processors. In these examples, the processors may be separate processors. In other words, the processors may be packaged separately, that is, totally separated machines. Alternatively, the different processors may be processor cores packaged together within a single unit or package, such as, for example, cell broadband engine chip 300 in FIG. 3. Further, more than one processor may be used to process the data generated by the instrumentation processor generating the data. As such, a set of processors containing one or more processors provide analysis functions.

Figure 4:
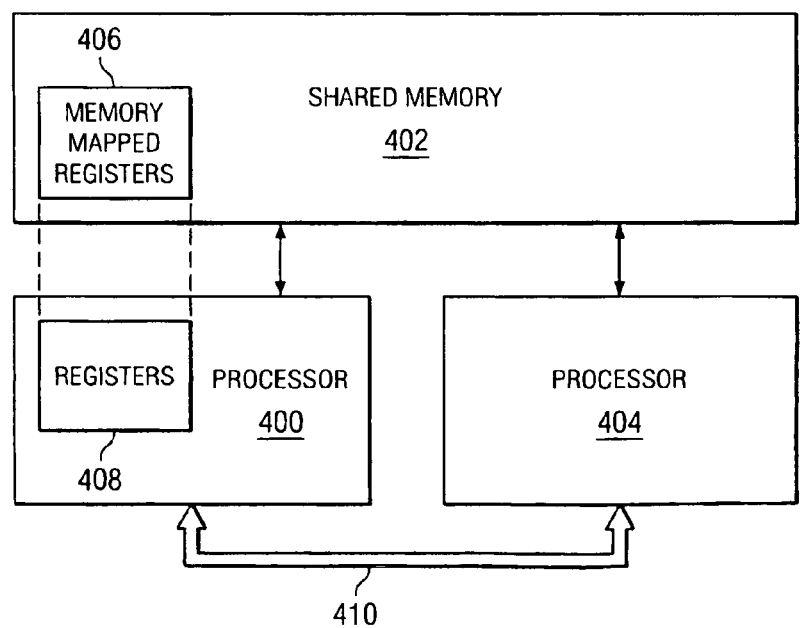
FIG. 4 is a high level diagram of an architecture used for profiling in accordance with an illustrative embodiment of the present invention.

Turning now to FIG. 4, a high level diagram of an architecture used for profiling is depicted in accordance with an illustrative embodiment of the present invention. In this example, processor 400 is the instrumentation processor that executes the code or program for which profiling is to occur. In these examples, this code includes a minimal amount of instrumentation for generating data for storage in shared memory 402.

Processor 404 is the profiling processor in these examples. Processor 404 actually processes the data generated by processor 400 and stored in shared memory 402. This processing includes, for example, generating trees from data placed into shared memory 402.

In one embodiment, data is gathered in the instrumentation stub and made available to the profiling processor. The instrumentation stub may gather the metrics virtualized by thread as described in U.S. Pat. No. 6,539,339. In another embodiment, the raw instrumentation values from the performance monitor counters, such as, cycles, and instructions completed are gathered in the instrumentation stub and made available to the profiling processor. In this case, the raw values, along with the processor on which they where gathered, if required is made available. The metrics and processor identifier may be gathered while staying in application mode using the following logic:

Do {
P1=current processor
Get raw metric(s)
P2=current processor
Until (P1==P2)

In this embodiment, the raw values are converted to Per Thread Values by the profiling processor. One methodology for doing this type of profiling uses tracing, such as, event tracing for Windows (ETW), where events such as, dispatches are logged with cycle or other metric counts. The profiling processor virtualizes the metrics by thread and converts the specific metrics on the processor to the virtualized count.

The data may be placed into shared memory 402 using a number of different types of approaches. One approach includes using memory mapped registers 406. Data in registers 408 are accessible through shared memory 402. Memory mapped registers 406 are considered universal registers because these registers may be accessed over processor core internal busses making these types of registers accessible to all internal bus masters and to external bus masters, such as other processors. Memory mapped registers 406 have absolute addresses associated with them, meaning that these types of registers can be accessed by other processors via memory access.

Other mechanisms for sharing data between processors 400 and 404 include remote procedure calls (RPCs) and inter-processor interrupts (IPIs). Inter-processor interrupts are sent between processor 400 and processor 404 using connection 410. Connection 410 is a line or a bus that connects processor 400 and processor 410 to provide a communication link for inter-processor communications. Mini-remote procedure calls (mRPCs) also may be employed. These types of RPCs are common with the cell processors, such as cell broadband engine chip 300 in FIG. 3.

Although the illustrative examples in FIG. 4 show two processors, the aspects of the present invention may be applied to multiple processors, which may be implemented as multiple cores. As another example, performance monitor counters, such as those found in performance monitoring unit 240 in FIG. 2 may be set up for access through shared memory 402 as memory mapped registers. In this manner, processor 404 may read or write counters and control registers within registers 408 and processor 400 by accessing addresses for memory mapped registers 406 within shared memory 402. Shared memory 402 may be implemented using a number of different mechanisms. For example, shared memory 402 may be implemented using existing hardware, such as real or system memory. Alternatively, shared memory 402 may be a specialized cache or memory that is accessible just by processors or processor cores.

Figure 5:
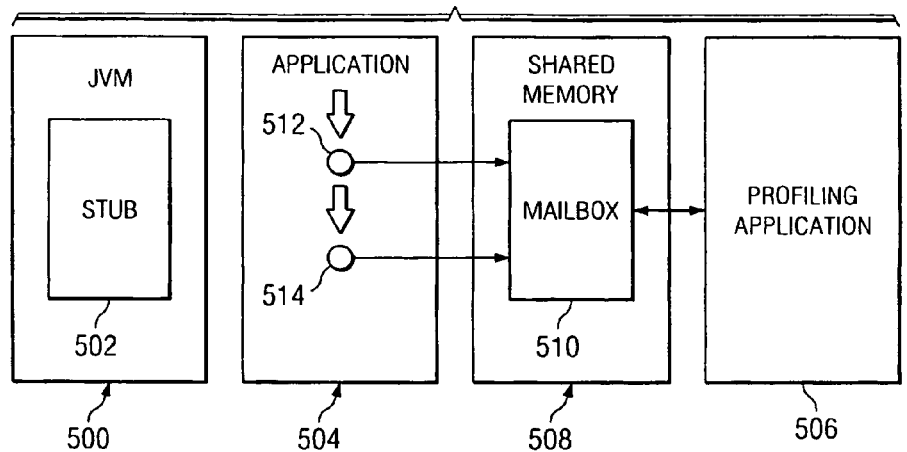
FIG. 5 is a diagram illustrating software components used in generating and processing data during profiling in accordance with an illustrative embodiment of the present invention.

Turning now to FIG. 5, a diagram illustrating software components used in generating and processing data during profiling is depicted in accordance with an illustrative embodiment of the present invention. In this example, JAVA virtual machine (JVM) 500, instrumentation stub 502, and application 504 are software components executing on an instrumentation processor. This instrumentation processor is, for example, processor 400 in FIG. 4. Profiling application 506 executes or runs on a profiling processor, such as processor 404 in FIG. 4. JAVA virtual machine 500 and instrumentation stub 502 write collected data from application 504 into shared memory 508. In this particular example, the data is written into mailbox 510.

Code is placed into application 504 to generate trace events. In theses illustrative examples, events 512 and 514 are generated during the execution of application 504. JAVA virtual machine 500 includes a profiling interface that is used to obtain callouts on every entry and exit from application 504. The events causing the entry and exits into the application, such as events 512 and 514, are collected through instrumentation stub 502. This particular component actually collects the data in response to events 512 and 514 and places the data into mailbox 510. The data that may be collected includes, for example, performance counter data. Specific performance counter data includes instructions completed, cycles, cache misses or any other data that can be counted in the performance monitor counters. With this type of data, raw counter values, in these examples, if a mini-remote procedure call (mRPC) is made from one processor to another processor, instrumentation stub 502 generates this call to let the other processor know that data is present in mailbox 510. The data collected by instrumentation stub 502 is referred to as raw data. Instrumentation stub 502 may convert the raw data into per thread data. Per thread data or per thread metrics are metrics that have been virtualized by thread. For example, the metrics may be saved and restored by thread or a device driver may get control on dispatches and accumulate the metrics by thread.

Figure 6:
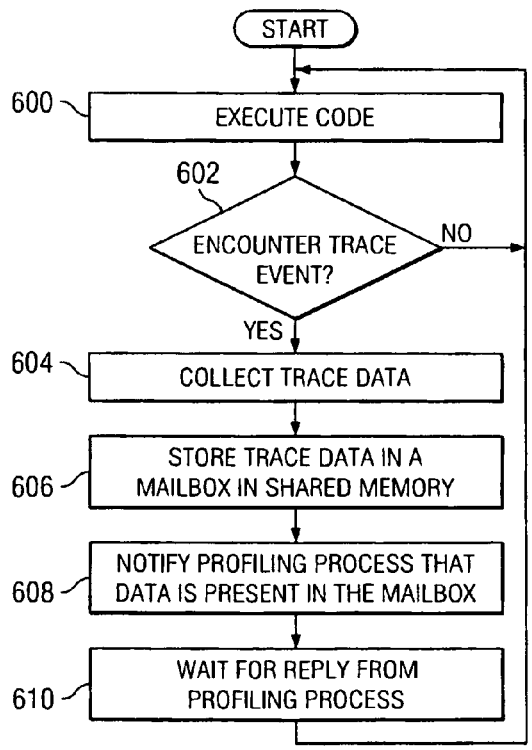
FIG. 6 is a flowchart of a high level process for collecting and storing trace data in a shared memory in accordance with an illustrative embodiment of the present invention.

Referring now to FIG. 6, a flowchart of a high level process for collecting and storing trace data in a shared memory is depicted in accordance with an illustrative embodiment of the present invention. The process illustrated in FIG. 6 may be implanted in a software component, such as JAVA Virtual Machine (JVM) 500 in FIG. 5. The JAVA Virtual Machine may be instrumented, such as, the JAVA Virtual Machine Profiling Interface (JVMPI) or the JAVA Virtual Machine Tools Interface (JVMTI) or by using byte code instrumentation. The process begins by executing the code on the processor step 600. The process illustrated is for a synchronous operation and notification protocol in the profiling process. In a synchronous operation and notification protocol, the processors wait for each other to complete tasks before continuing. This code is similar to application 504 in FIG. 5.

The process begins by executing code-(step 600). In these examples, the code is for an application, such as application 504 in FIG. 5. A determination is made as to whether a trace event has been encountered (step 602). If a trace event has not been encountered, the process returns to step 600.

Otherwise, the process collects the trace data (step 604). In this particular example, an instrumentation stub in the JAVA virtual machine collects the trace data. Thereafter, the process stores the trace data in a mailbox in shared memory (step 606). The process then notifies the profiling process that data is present in the mailbox (step 608). The process then waits for a reply from the process or the profiling processor (step 610) indicating that the data processing is complete. The process returns to step 600 to continue to execute code when a reply is received.

Figure 7:
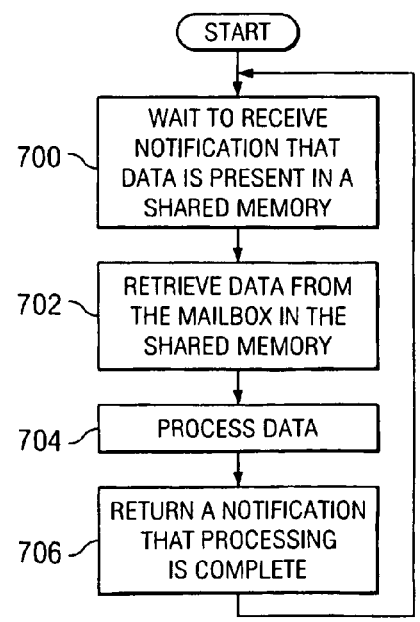
FIG. 7 is a flowchart of a process used by profiling application in accordance with an illustrative embodiment of the present invention.

Turning now to FIG. 7, a flowchart of a process used by profiling application is depicted in accordance with an illustrative embodiment of the present invention. The process illustrated in this figure is for a synchronous operation and notification protocol. The process may be implemented in a profiling application such as profiling application 506 in FIG. 5.

The process waits to receive a notification that data is present in a shared memory (step 700). The process retrieves data from the mailbox in the shared memory when a notification is received (step 702). Thereafter, the data is processed (step 704), and a return notification is sent to indicate that processing is complete (step 706). The process then returns to step 700 as described above. In these examples, the notification reply made by the two processors may be implemented using different mechanisms, such as a remote procedure call or an inter-processor interrupt.

Turning now to FIG. 8, a flowchart of a process for storing data generated by trace event in a shared memory is depicted in accordance with an illustrative embodiment of the present invention. The process illustrated in FIG. 8 may be implemented in a software component, such as JAVA virtual machine (JVM) 500 in FIG. 5. The process illustrated in FIG. 8 is for an asynchronous operation and notification protocol. In an asynchronous operation and notification protocol, the processes do not wait for a notification or signal that the other process has received or processed data. Instead, the processes continue.

The process begins by executing the application (step 800). A determination is made as to whether a trace event has been detected (step 802). If a trace event has not been detected, the process returns (step 800) to continue executing the application. Otherwise, trace data from the trace event is collected (step 804). The process then places this trace data in a mailbox in shared memory (step 806). The process then notifies the profiling process of the presence of data in the mailbox (step 808) with the process then returning to step 800. The act of placing of the data in the mailbox could also notify the profiling process of the presence of the data in the mailbox.

Turning now to FIG. 9, a flowchart of a process for a profiling processor to collect and process data from a mailbox in a shared memory is depicted in accordance with an illustrative embodiment of the present invention. The process illustrated in FIG. 9 may be implemented in a process, such as profiling application 506 in FIG. 5.

The process begins by waiting for a notification by the instrumentation process (step 900). In this example, the instrumentation process is an instrumentation stub in the JVM that generates a mini-remote procedure call or an IPI. The process then reads the data from the mailbox (step 902) and processes the data (step 904). The process then returns to step 900 as described above. This process is for an asynchronous operation and notification protocol.

Next in FIG. 10, a flowchart of a process for use in an instrumentation processor for a polling protocol to collect and store data is depicted in accordance with an illustrative embodiment to the present invention. The process illustrated in FIG. 10 is executed by a software component, such as JVM 500 in FIG. 5. The process illustrated in FIG. 10 and FIG. 11 is one in which storing and polling occurs to process the data.

The process begins by executing an application (step 1000). Thereafter, a determination is made as to whether a trace event has been detected (step 1002). If a trace event has been detected, the process collects the trace data (step 1004) and places the trace data in a mailbox in the shared memory (step 1006). With the process then returning to step 1000. With reference again to step 1002, if a trace event has not been detected during execution of the application, the process returns to step 1000.

Turning now to FIG. 11, a flowchart of a process for use in a profiling processor to obtain data using a polling protocol is depicted in accordance with an illustrative embodiment to the present invention. The process illustrated in FIG. 11 may be implemented in a process, such as profiling application 500 in FIG. 5.

The process begins by polling a mailbox in shared memory for the presence of data (step 1100). A determination is made as to whether data is present in the mailbox (step 1102). If data is not present, the process returns to step 1100. Otherwise, the process reads the data from the mailbox in the shared memory (step 1104). Thereafter, the process processes the data (step 1106) with the process then returning to step 1100.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of gathering data related to performance in a multiprocessing environment comprising:

executing a program on a processor, wherein the program includes instrumentation code; writing, by the instrumentation code in the program, data to a shared memory in response to events occurring during execution of the program, wherein the data is generated during the execution of the program on the processor using the shared memory to convey the data to a set of profiling processors, wherein the writing step comprises collecting raw data by an instrumentation stub, converting the raw data into per thread data, and the per thread data is data for a particular thread, wherein the per thread data comprise metrics that are virtualized by thread, and writing the per thread data to the shared memory; and collecting, by the set of profiling processors, the data in the shared memory written by the instrumentation code.

2. The computer implemented method of claim 1 further comprising:

processing the data for analysis.

3. The computer implemented method of claim 2, wherein the processing step comprises:

generating a profile of the program executing the instrumentation code and program.

4. The computer implemented method of claim 3, wherein the profile includes the resources used by the program executing in the processor.

5. The computer implemented method of claim 1, wherein the writing step comprises:
    writing the data into a mailbox in the shared memory.

6. The computer implemented method of claim 5 further comprising:
    halting execution of the program until an indication is received from the set of profiling processors that the data has been collected by the set of profiling processors.

7. The computer implemented method of claim 1 further comprising:
    signaling, by the processor, to the set of profiling processors to indicate that performance related data is available in the shared memory.

8. The computer implemented method of claim 7, wherein the signaling step comprises:
    sending a remote procedure call from the processor to the set of profiling processors.

9. The computer implemented method of claim 7, wherein the signaling step comprises:
    sending an inter-processor interrupt from the processor to the set of profiling processors.

10. The computer implemented method of claim 1 further comprising:
    polling, by the set of profiling processors, the shared memory to determine when the data is available for collection.

11. The computer implemented method of claim 1, wherein the instrumentation code is an instrumentation stub.

12. The computer implemented method of claim 1, wherein the set of profiling processors comprises at least one processor core.

13. The computer implemented method of claim 1, wherein the shared memory comprises a set of memory mapped registers accessible by the set of profiling processors.

14. A computer program product of gathering data related to performance in a multiprocessing environment, the computer program product comprising:
    a non-transitory computer usable medium having computer usable program code tangibly embodied there on, the computer usable program code comprising:
    computer usable program code for executing a program on a processor, wherein the program includes instrumentation code;
    computer usable program code for writing, by the instrumentation code in the program, data to a shared memory in response to an event occurring during execution of the program, wherein the data is generated during the execution of the program on the processor using the shared memory to convey the data to a set of profiling processors, wherein the computer usable program code for writing comprises computer usable program code for collecting raw data by an instrumentation stub, converting the raw data into per thread data, and the per thread data is data for a particular thread, wherein the per thread data comprise metrics that are virtualized by thread, and writing the per thread data to the shared memory; and
    computer usable program code for collecting, by the set of profiling processors, the data in the shared memory written by the instrumentation code.

15. The computer program product of claim 14 further comprising:
    computer usable program code for processing the data for analysis.

16. The computer program product of claim 15, wherein the computer usable program code for processing the data for analysis comprises:
    computer usable program code for generating a profile of the program executing the instrumentation code and program.

17. The computer program product of claim 14 further comprising:
    computer usable program code for halting execution of the program until an indication is received from the set of profiling processors that the data has been collected by the set of profiling processors.

18. The computer program product of claim 14, wherein the computer usable program code for writing, by the instrumentation code, data to a shared memory in response to events occurring during execution of the program, wherein the data is generated during execution of the program on the processor and the instrumentation code uses the shared memory to convey the data to a set of profiling processors comprises:
    computer usable program code for writing the data into a mailbox in the shared memory.

19. The computer program product of claim 14 further comprising:
    computer usable program code for signaling, by the processor, to the set of profiling processors to indicate that performance related data is available in the shared memory.

20. The computer program product of claim 19, wherein the computer usable program code for signaling, by processor, to the set of profiling processors to indicate that performance related data is available in the shared memory comprises:
    computer usable program code for sending a remote procedure call from the processor to the set of profiling processors.

21. The computer program product of claim 19, wherein the computer usable program code for signaling, by processor, to the set of profiling processors to indicate that performance related data is available in the shared memory comprises:
    computer usable program code for sending an inter-processor interrupt from the processor to the set of profiling processors.

22. The computer program product of claim 14 further comprising:
    computer usable program code for polling, by the set of profiling processors, the shared memory to determine when the data is available for collection.

23. The computer program product of claim 14, wherein the shared memory comprises a set of memory mapped registers accessible by the set of profiling processors.

24. A data processing system comprising:
    a shared memory; a first processor in communication with the shared memory, wherein the first processor executes an instrumented program and writes data to the shared memory in response to events occurring during execution of the instrumented program containing instrumented code, wherein the data is generated during the execution of the instrumented program on the first processor, and wherein the shared memory is used to convey the data to a set of profiling processors, wherein the writing of the data to the shared memory comprises collecting raw data by an instrumentation stub, converting the raw data into per thread data, and the per thread data is data for a particular thread, wherein the per thread data comprise metrics that are virtualized by thread, and writing the per thread data to the shared memory; and a second processor in communication with the shared memory, wherein the second processor collects the data in the shared memory.

25. The data processing system of claim 24, wherein the first processor processes the data for analysis.

26. The data processing system of claim 25, wherein the first processor generates a profile of the instrumented program.

27. The data processing system of claim 24, wherein the first processor halts execution of the instrumented program until an indication is received from the second processor that the data has been collected by the second processor from the shared memory.

28. The data processing system of claim 24, wherein the first processor writes the data into a mailbox in the shared memory.

29. The data processing system of claim 24, wherein the first processor unit sends a signal to the second processor to indicate that performance related data is available in the shared memory.

30. The data processing system of claim 29, wherein the first processor sends a remote procedure call from the first processor to the second processor.

31. The data processing system of claim 29, wherein the first processor sends an inter-processor interrupt from the first processor to the second processor.

32. The data processing system of claim 24, wherein the second processor polls the shared memory to determine when the data is available for collection.

33. A data processing system for gathering data related to performance in a multiprocessing environment comprising:

executing means for executing a program on a processor, wherein the program includes instrumentation code;

writing means for writing, by the instrumentation code in the program, data to a shared memory in response to event occurring during execution of the program, wherein the data is generated during the execution of the program on the processor using the shared memory to convey the data to a set of profiling processors, wherein the writing means comprises means for collecting raw data by an instrumentation stub, converting the raw data into per thread data, and the per thread data is data for a particular thread, wherein the per thread data comprise metrics that are virtualized by thread, and writing the per thread data to the shared memory; and a means for collecting, by the set of profiling processors, the data in the shared memory written by the instrumentation code.

34. An apparatus comprising:

instrumentation code and a program executing on a first processor;

profiling application executing on a second processor; and a shared memory, wherein the instrumentation code collects raw data, converts the raw data into per thread data, wherein the per thread data is data for a particular thread that comprises metrics that are virtualized by thread, and places the per thread data in the shared memory in response to events generated during execution of the program and wherein the profiling application processes the data for analysis, wherein the first processor is a first processing core of a single chip multi-core data processor and the second processor is second processing core of the single chip multi-core data process.

* * * * *